United States Patent [19]

Fukumizu

[11] Patent Number: 5,060,278

[45] Date of Patent: Oct. 22, 1991

[54] PATTERN RECOGNITION APPARATUS USING A NEURAL NETWORK SYSTEM

[75] Inventor: Kenji Fukumizu, Yokohama, Japan

[73] Assignee: Ricoh Company, Ltd., Japan

[21] Appl. No.: 524,271

[22] Filed: May 15, 1990

[30] Foreign Application Priority Data

May 20, 1989 [JP] Japan .................................. 1-127389

[51] Int. Cl.⁵ .............................................. G06K 9/62
[52] U.S. Cl. ....................................... 382/14; 382/15; 382/36; 382/38; 364/513
[58] Field of Search ........................ 382/14, 15, 38, 36; 364/513, 274.9

[56] References Cited

U.S. PATENT DOCUMENTS

| | | | |
|---|---|---|---|
| 4,326,259 | 4/1982 | Cooper et al. | 364/513 |
| 4,760,604 | 7/1988 | Cooper et al. | 364/513 |
| 4,805,225 | 2/1989 | Clark | 364/513 |
| 4,876,731 | 10/1989 | Loris et al. | 382/15 |
| 4,958,375 | 9/1990 | Reilly et al. | 382/14 |
| 4,965,725 | 10/1990 | Rutenberg | 382/15 |

Primary Examiner—Leo H. Boudreau
Assistant Examiner—David Fox
Attorney, Agent, or Firm—Mason, Fenwick & Lawrence

[57] ABSTRACT

A pattern recognition apparatus includes a pattern input unit inputting pattern data and learning data, and a neural network system including a plurality of neural networks, each of the plurality of neural networks being assigned a corresponding one of a plurality of identification classes and having only two output units of a first unit (Uo1) and a second unit (Uo2). Learning for each of the plurality of neural networks is performed by using the learning data. The image recognition apparatus also includes judgment unit judging which one of the identification classes the pattern data input from the image reading unit belongs to on the basis of output values A and B from the two output units (Uo1) and (Uo2) of all neural networks.

11 Claims, 9 Drawing Sheets

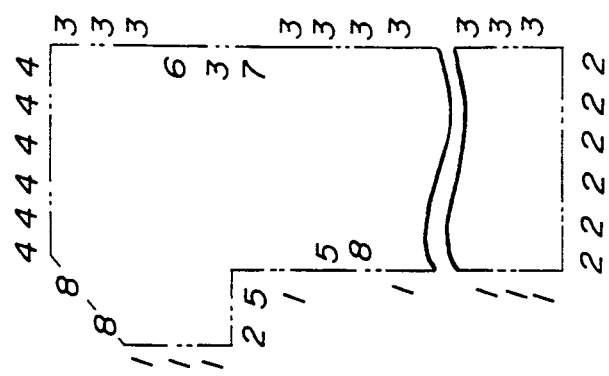
FIG. 9
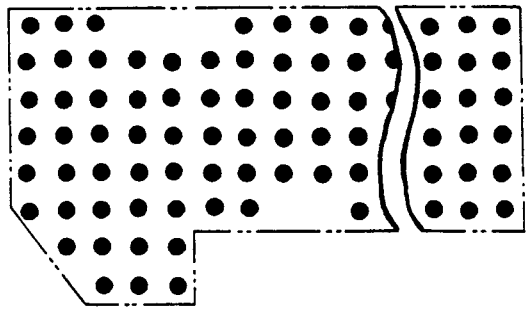
FIG. 10A
FIG. 10B

PATTERN RECOGNITION APPARATUS USING A NEURAL NETWORK SYSTEM

BACKGROUND OF THE INVENTION

The present invention relates to a pattern recognition apparatus using a neural network system. This pattern recognition apparatus identifies patterns such as handwritten characters.

Technology relating to a pattern recognition apparatus using a neural network system has been disclosed in "Character recognition system using a neural network" (Yamada et. al.: Electronics Information Communications Association Bulletin PRU 88-58, pp. 79-86). This type of conventional technology uses a neural network of the layered type. This layered type of neural network has an input layer, an intermediate layer and an output layer. The output layer has the same number of output units as there are identification classes and each of the output units corresponds to one identification class. The identification class (also known as simply a "class") is information that specifies a pattern that can be identified. The learning for this neural network is performed so that when the neural network receives a predetermined learning pattern corresponding to each of identification classes, only the output unit corresponding to the identification class outputs "1" and the other output units output "0"s. In such a layered type of neural network, when an unknown pattern is applied, output values within a range of "0" or more and "1" or less appear in each output unit. Then, the identification class corresponding to the one of those output units in which the greatest output value appears, is the result of recognition with respect to that unknown pattern.

As has been described above, in a conventional pattern recognition apparatus using a layered type of neural network in which the output layer has a number of output units equal to the number of identification classes, increasing the number of identification classes (the number of patterns to be recognized) has the following disadvantages.

First, the total number of links in the neural network increases to make learning difficult.

Second, even output values differ greatly from the values that are desired, those output values are used as the basis for the judgment.

In addition, the identification class to which an input pattern belongs is judged by the greatest value for the output values appearing in each of the output units and so judgment to the effect that "the input pattern does not belong to any identification class" must be performed on the basis of a threshold value. Furthermore, when the number of identification classes increase, it is difficult to determine the threshold value.

In addition, in "Towards the construction of a large-scale neural network" (Mori; Electronics Information Communications Association Bulletin PRU 88-59, pp. 87-94), is proposed other technology relating to pattern recognition using a neural network.

In this conventional technology, a plural number of small-scale neural networks (sub-nets) and a neural network (a super-net) which inputs the outputs of these sub-nets are linked in layers. Then, the output layer of the super-net has a number of output units which is the same as the number of identification classes. As has been described above, conventional pattern recognition using a neural network that is the layered linking of a super-net and sub-nets as has been described above, has the following disadvantages. First, the information that is to be output from each of the sub-nets must be determined so that the desired values are obtained from the super-net. Second, the super-net becomes very large when the number of identification classes is increased and this makes learning of the super-net difficult.

Accordingly, it is currently difficult to configure a high-performance and large-scale neural network.

In addition, the performance of pattern recognition in accordance with the output values of a super-net and judgments such as "the input pattern does not belong to any identification class" must be performed on the basis of a threshold value, as has been described above.

SUMMARY OF THE INVENTION

Accordingly, it is a general object of the present invention to provide a novel and useful pattern recognition apparatus using a neural network in which the problems described heretofore are eliminated.

A more specific object of the present invention is to provide a pattern recognition apparatus in which the learning of the neural network is faciliated.

Another object of the present invention is to provide a pattern recognition apparatus that can accurately identify classes to which an input pattern relates.

Still another object of the present invention is to provide a pattern recognition apparatus that can determine whether or not the judgment for a class to which an input pattern relates is possible, and without such being dependent upon the use of threshold values.

The above objects of the present invention is achieved by a pattern recognition apparatus comprising pattern input means for inputting pattern data and learning data a neural network system including a plurality of neural networks each receiving the pattern data from the pattern input means, each of the plurality of neural networks being assigned a corresponding one of neural networks being assigned a corresponding one of a plurality of identification classes and having only two output units of a first unit (Uo1) and a second unit (Uo2), learning for each of the plurality of neural networks being performed by using the learning data belonging to one of the identification classes so that when each of the neural networks receives the learning data belonging to the corresponding one of the identification classes an output value A from the first unit (Uo1) equals to a first value V1 and an output value B from the second unit (Uo2) equals to a second value V2, when each of the neural networks receives learning data belonging to one of the identification classes other than said corresponding one of the identification classes the output value A from the first unit (Uo1) equals to the second value V2 and the output value B from the second unit (Uo2) equals to the first value V1, and judgment means for judging which one of the identification classes the pattern data from the pattern input means belongs to one the basis of output values A and B from the two output units (Uo1) and (Uo2) of all neural networks.

Other objects and further features of the present invention will be apparent from the following detailed description when read in conjunction with the accompanying drawings.

BRIEF DESCRIPTION OF THE DRAWINGS

FIG. 9 is a diagram indicating the relationship between pixel patterns and direction codes;

FIG. 10A is a diagram indicating an example of normalized image data;

FIG. 10B is a diagram indicating direction codes corresponding to the image data indicated in FIG. 10A;

DESCRIPTION OF THE PREFERRED EMBODIMENTS

A description will be given of a pattern recognition apparatus according to the present invention with reference to FIGS. 1 through 5. This pattern recognition apparatus can recognize the handwritten numerals from "0" through "9". Accordingly, the identification classes are expressed as $C_0$, C, ... and $C_9$ corresponding to the numerals "0" through "9".

Figure 1:
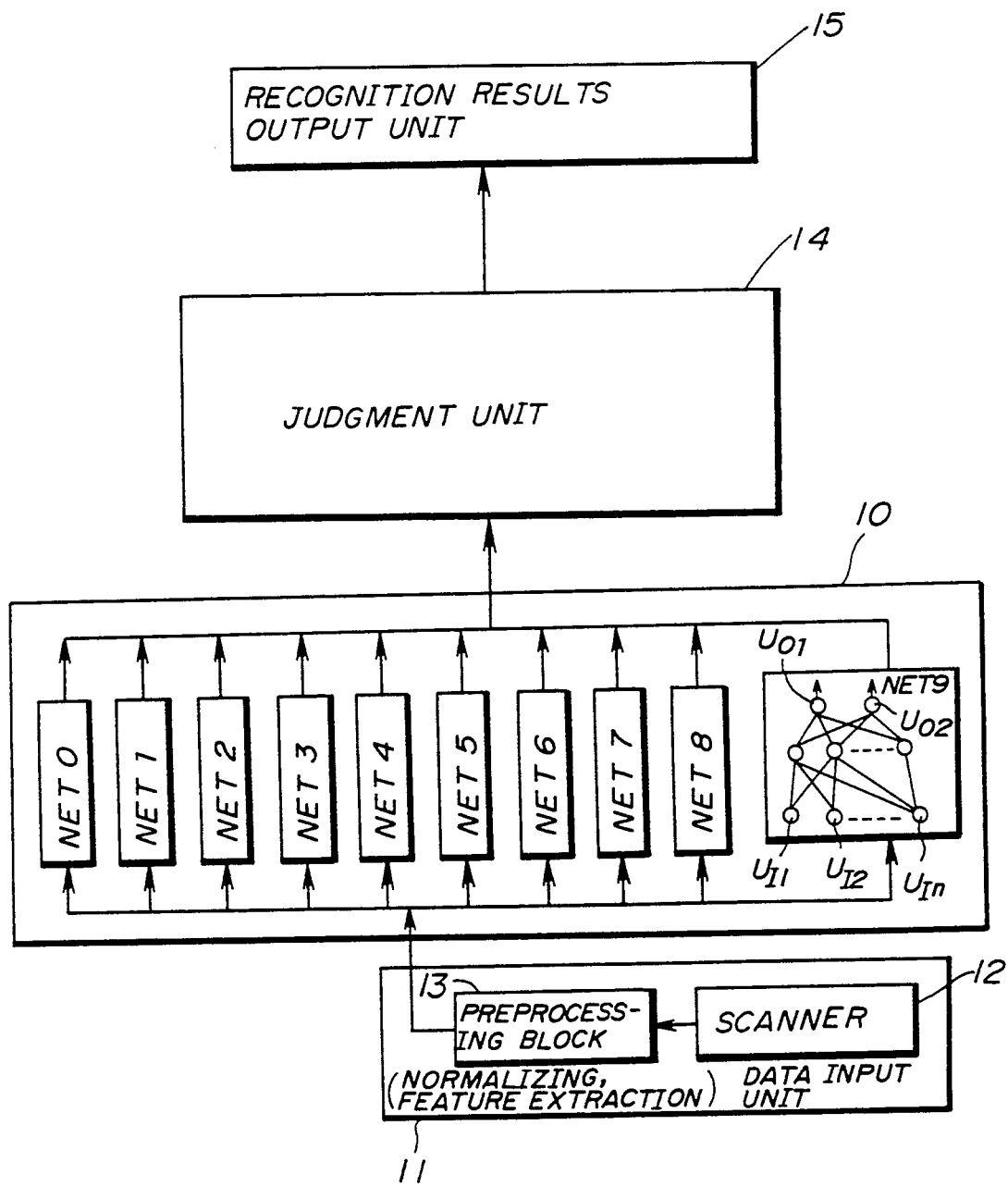
FIG. 1 is a block diagram indicating an embodiment of the pattern recognition apparatus according to the present invention.

FIG. 1 indicates the basic configuration of the pattern recognition apparatus according to the present invention.

A data input unit 11 has a scanner 12 and a preprocessing block 13. The scanner 12 optically reads patterns (numerals) written on a sheet, and outputs image data corresponding to the patterns read. The preprocessing block 13 normalizes the image data from the scanner 12 and extracts feature vectors. These feature vectors are output from the scanner 12 as data of the n'th dimension. A neural network system 10 is provided with a layered type of neural network ($NET_i$) Each of the neural networks ($NET_i$) corresponds to the one of the classes $C_i$ (i=0, 1, 2, ... ). These neural networks ($NET_i$) operate in parallel and as a whole configure a single neural network system. The input layer of each of the neural networks ($NET_i$) has a number of input units $U_{I1}$, $U_{I2}$, ... and $U_{In}$ that is the same as the number of dimensions (n) of the feature vector output from the data input unit 11. The output layers of each of the neural networks ($NET_i$) has two output units $U_{01}$ and $U_{02}$. The structure of the intermediate layer of each of the neural networks ($NET_i$) is determined arbitrarily and correspondingly the input layer to $U_{In}$) and output layer 1, $U_{02}$). The feature vector from the data input unit 11 inputs in parallel to each of the input layer of the ten neural networks $NET_0$, $NET_1$..., and $NET_9$. Each of the neural networks ($NET_i$) has functions to judge whether or not an input feature vectors belongs to a class $C_i$ corresponding to the neural network ($NET_i$). Learning for each of the neural networks ($NET_i$) is performed so that if predetermined learning data belongs to a class $C_i$, the output values ($A_i$, $B_i$) from the output units ($U_{01}$, $U_{02}$) are (1, 0) if the learning data does not belong to the class Ci, the output values (Ai, Bi) from the output units ($U_{o1}$, $U_{o2}$) are (0, 1). Then, if the feature vector (input data) of an image input to each of the neural networks ($NET_i$) has a high probability of belonging to a class $C_i$ corresponding to that neural network ($NET_i$), then the relationship between the output values is $A_i > B_i$. The value for $A_i$ is larger for the greater that probability is. The ranges of the output values $A_i$ and $B_i$ are $0 \leq A_i \leq 1$ and $0 \leq B_i \leq 1$.

A judgment unit 14 judges according to a predetermined algorithm, of the class of a numeral pattern specified by the extracted feature vector on the basis of the ten sets of output value ($A_i$, $B_i$) from the neural network system 10. In addition, this judgment unit 14 also performs the "the input numeral pattern does not belong to any of the ten identification classes" judgment. This judgment result is termed "rejection". A recognition results output unit 15 has a printer and a CRT display for example, and prints and outputs the judgment results of the judgment unit 14.

Figure 2:
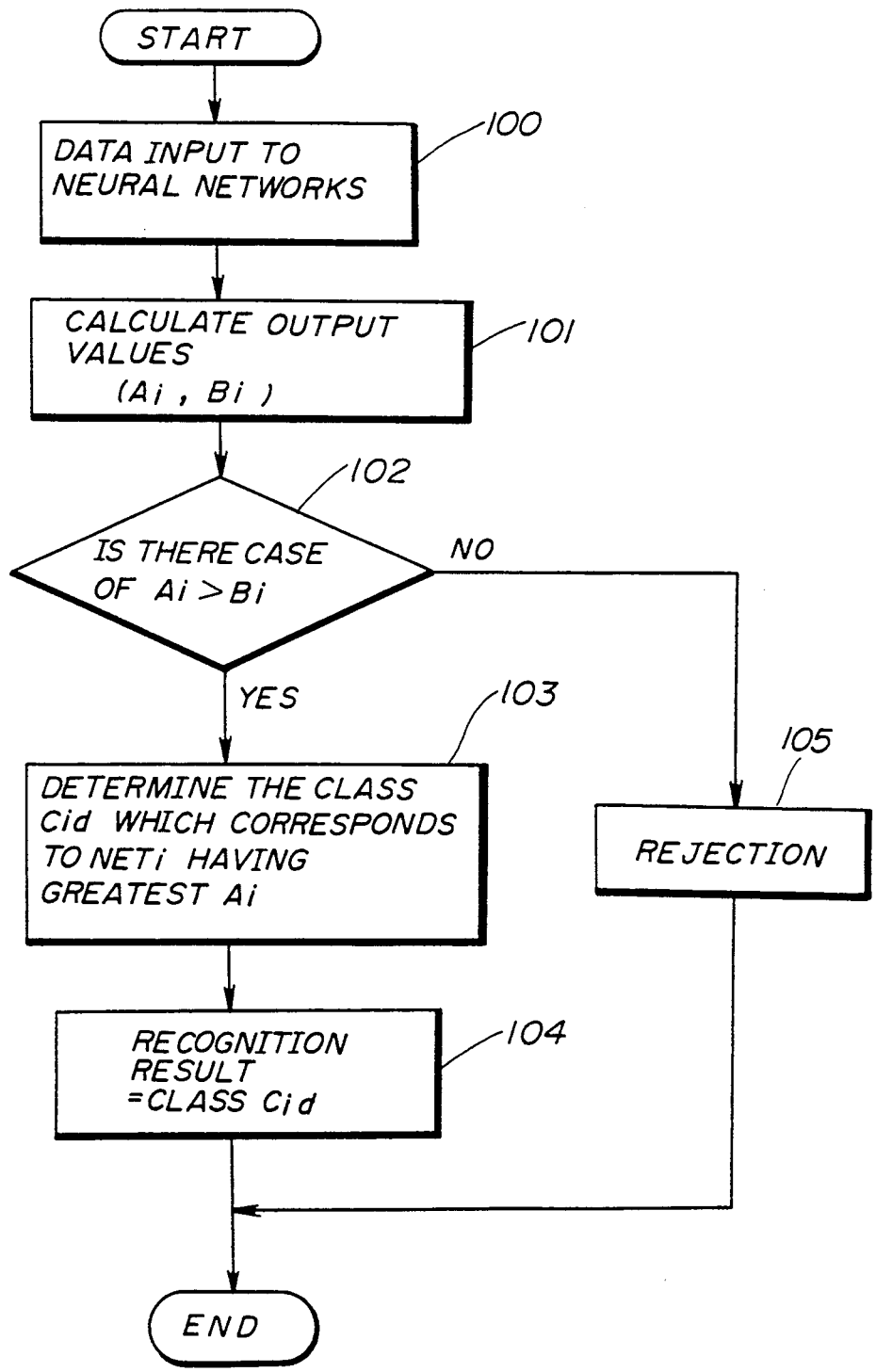
FIG. 2 is a flow chart indicating an example of the processing of the pattern recognition apparatus according to the present invention.

The following is a description of the processing relating to pattern recognition, with reference to the flow chart indicated in FIG. 2.

The numerals written on a sheet are read by the data input unit 11 and the data input unit 11 outputs the feature vectors corresponding to the read characters. Then, the neural network system 10 and the judgment unit 14 perform the processing in accordance with the flow chart indicated in FIG. 2.

In FIG. 2, in step 100, the feature vectors data from the data input unit 11 is input to each of the neural networks ($NET_0$, $NET_1$, ... $NET_9$). Then, in processing step 101, each of the neural networks ($NET_i$) perform calculation and the output values ($A_i$, $B_i$) from the output units ($U_{01}$, $U_{02}$) of each of the neural networks ($NET_i$) are obtained. Then, in processing step 102, the judgment unit 14 uses the output values from the ten neural networks ($NET_i$) as the basis for selecting the class $C_i$ corresponding to neural networks ($NET_i$) for which $A_i \geq B_i$ as the candidates. Furthermore, in processing step 103, the judgment unit 14 determines the class $C_{id}$ corresponding to the neural network (NET) for which the value of $A_i$ is greatest, from those classes $C_i$ that have been selected as candidates. Then, in processing step 104, the judgment unit 14 outputs the class $C_{id}$ that has been selected as described above, as the recognition results.

In processing step 102, if there is only one class $C_i$ that is selected as the candidate, then, that candidate class $C_i$ is the recognition result. In addition, in processing step 102, if no class $C_i$ has been selected as the candidate, then in processing step 104, the judgment unit 14 makes a rejection judgment and outputs a predetermined rejection code.

Figure 3:
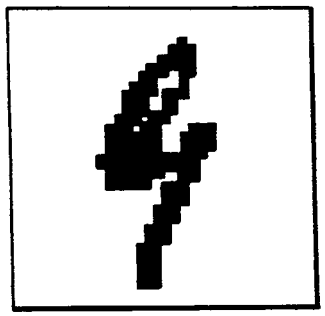
FIGS. 3 through 6 are diagram indicating numerals that are the object of recognition.

For example, in the case for where the feature vector of the image data for the numerals written as indicated in FIG. 3 is input into the neural network system 10, then the output values ($A_i$, $B_i$) of each of the neural networks ($NET_i$) are as indicated in TABLE 1.

TABLE 1

| | |
|---|---|
| $A_0 = 0.000$ | $B_0 = 1.000$ |
| $A_1 = 0.000$ | $B_1 = 1.000$ |
| $A_2 = 0.000$ | $B_2 = 1.000$ |
| $A_3 = 0.000$ | $B_3 = 1.000$ |
| $A_4 = 0.000$ | $B_4 = 0.999$ |
| $A_5 = 0.000$ | $B_5 = 1.000$ |
| $A_6 = 0.000$ | $B_6 = 1.000$ |

TABLE 1-continued

| | |
|---|---|
| $A_7 = 0.303$ | $B_7 = 0.700$ |
| $A_8 = 0.000$ | $B_8 = 1.000$ |
| $A_9 = 0.000$ | $B_9 = 1.000$ |

In this case, the output values ($A_i$, $B_i$) of all of the neural networks ($NET_j$) are $A_i \leq B_i$. Accordingly, not even one candidate is selected, and the judgment unit 14 outputs the rejection code since the none of the numerals from "0" through "9" is seen as the image indicated in FIG. 3.

Figure 4:
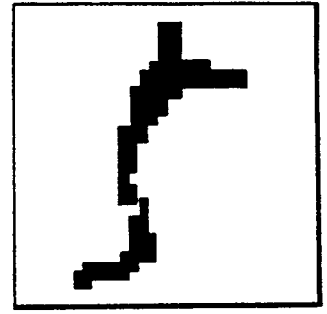

In addition, for example, in the case for where the feature vector of the image data for the handwritten numbers indicated in FIG. 4 are input to the neural network system 10, the output values ($A_i$, $B_i$) of each of the neural networks ($NET_j$) are as indicated in TABLE 2.

TABLE 2

| | |
|---|---|
| $A_0 = 0.000$ | $B_0 = 1.000$ |
| $A_1 = 0.000$ | $B_1 = 1.000$ |
| $A_2 = 0.000$ | $B_2 = 1.000$ |
| $A_3 = 0.415$ | $B_3 = 0.515$ |
| $A_4 = 0.000$ | $B_4 = 1.000$ |
| $A_5 = 0.827$ | $B_5 = 0.173$ |
| $A_6 = 0.001$ | $B_6 = 0.999$ |
| $A_7 = 0.000$ | $B_7 = 0.000$ |
| $A_8 = 0.000$ | $B_8 = 1.000$ |
| $A_9 = 0.000$ | $B_9 = 1.000$ |

In this case, when $i=5$, $A_i > B_i$ and so the judgment unit 14 judges that the image indicated in FIG. 4 belongs to class $C_5$. This is to say that the judgment unit 14 judges that the handwritten image is the number "5".

Figure 5:
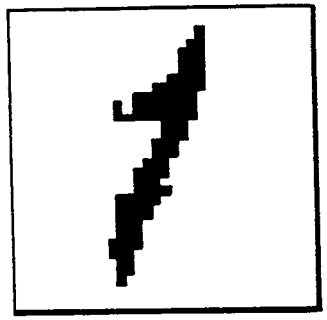

Furthermore, for example, when the feature vector of the handwritten numerical image data indicated in FIG. 5 are input to the neural network system 10, the output values ($A_i$, $B_i$) of each of the neural networks ($NET_j$) is as indicated in TABLE 3.

TABLE 3

| | |
|---|---|
| $A_0 = 0.000$ | $B_0 = 1.000$ |
| $A_1 = 0.917$ | $B_1 = 0.003$ |
| $A_2 = 0.000$ | $B_2 = 1.000$ |
| $A_3 = 0.000$ | $B_3 = 1.000$ |
| $A_4 = 0.000$ | $B_4 = 1.000$ |
| $A_5 = 0.000$ | $B_5 = 1.000$ |
| $A_6 = 0.000$ | $B_6 = 1.000$ |
| $A_7 = 0.624$ | $B_7 = 0.305$ |
| $A_8 = 0.000$ | $B_8 = 1.000$ |
| $A_9 = 0.000$ | $B_9 = 1.000$ |

In this case, $A_i > B_i$ when $i=1$ and $i=7$, and so the judgment unit 14 selects class $C_1$ and $C_2$ as the candidates. Then, $A_1(0.917) > A_7(0.624)$ and so the judgment unit 14 selects the class $C_1$ as the judgment result. This is to say that the handwritten image indicated in FIG. 5 is judged to be the numeral "1".

Figure 7:
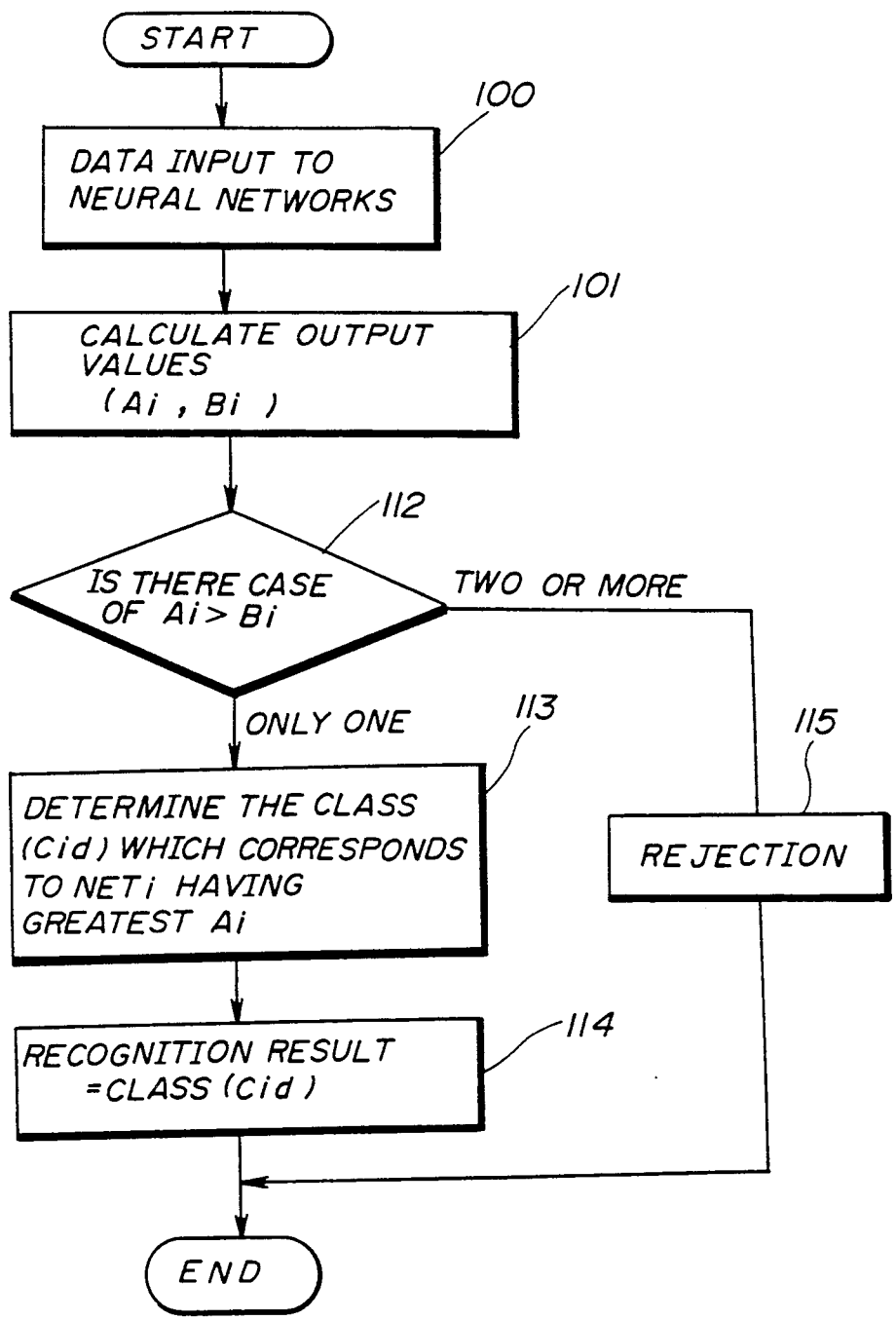
FIG. 7 is a flow chart indicating another example of the processing of the pattern recognition apparatus according to the present invention.

FIG. 7 indicates an example of the other processing relating to pattern recognition.

In this processing, as described earlier for the other processing, the feature vectors output from the data input unit 11 are input to each of the neural networks ($NET_j$) (in processing step 100) and each of the neural networks ($NET_j$) perform calculations to obtain the output values ($A_i$, $B_i$) from the units ($U_{01}$, $U_{02}$).

Then, in processing step 112, the judgment unit 14 selects the output value of those output values ($A_i$, $B_i$) from the ten neural networks ($NET_j$), for which $A_i > B_i$. Then, when that selected output value ($A_i$, $B_i$) is one, in processing step 113, the judgment unit 14 selects the class $C_i$ corresponding to the neural network ($NET_j$) having that output value, as the recognition result. Then, in processing step 114, the judgment unit 14 outputs the class $C_l$ that was determined. In processing step 112, if there are no output values ($A_i$, $B_i$) for which $A_i > B_i$ or if it has been judged that two or more exist, then in processing step 115, the judgment unit 14 performs the rejection judgment and outputs a predetermined rejection code.

As has been described above, it is judged as a rejection when there are two or more output values ($A_i$, $B_i$) for which $A_i > B_i$ so as to prevent the erroneous judgment of a vague character that differs greatly from the learning patterns.

The following is a description of another embodiment of the pattern recognition apparatus according to the present invention, with reference to FIGS. 8 through 10B. In this embodiment, when two or more candidates of an identification class have been selected, one of the above classes is selected as the recognition result by a separate recognition system that identifies the smaller class.

Figure 8:
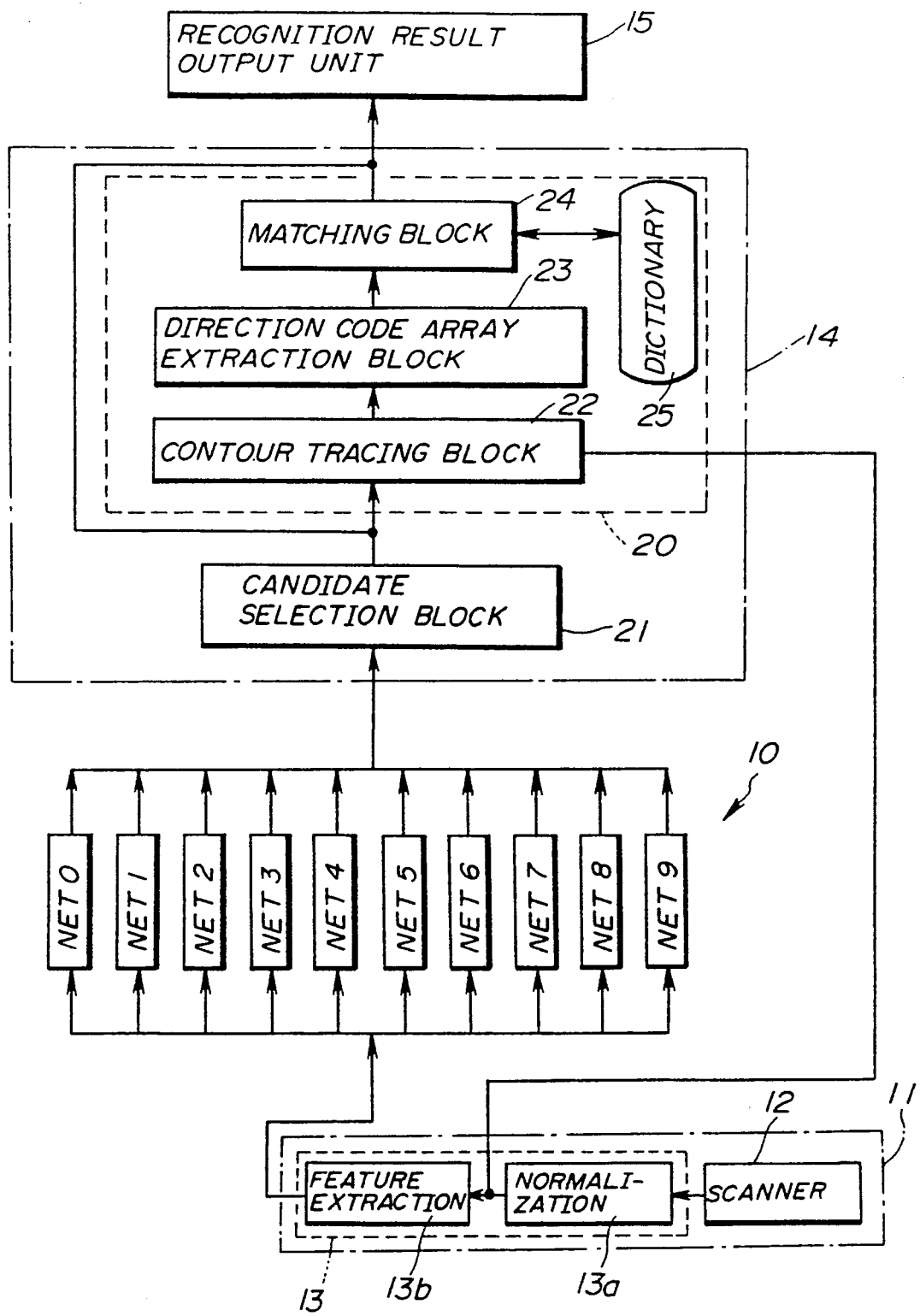
FIG. 8 is a block diagram indicating another embodiment of the pattern recognition apparatus according to the present invention.

In FIG. 8, the same numerals are used to described like parts with FIG. 1.

The data input unit 11 applies feature vector data corresponding to the read image to the neural network system 10. Each of the neural networks ($NET_j$) in the neural network system 10 supply output values ($A_i$, $B_i$) to the judgment unit 14. The candidate selection block 21 in the judgment unit 14 selects sets of output values (Ai, Bi) in which Ai > Bi as candidates from sets of output values output from ten neural networks (NETi). Then, if single set of output values ($A_i$, $B_i$) is selected, then the judgment unit 14 outputs the class $C_i$ corresponding to the neural net ($NET_j$) which outputs the output values (Ai, Bi), as the recognition results. In addition, if there are no output values ($A_i$, $B_i$) that satisfy the condition of $A_i > B_i$, then the judgment unit 14 performs the rejection judgment.

Furthermore, if the candidate selection block 21 selects two or more candidates, then the processing starts by two-character recognition system 20. This two-character recognition system 20 has a contour tracing block 22, a direction code array extraction block 23, a matching block 24 and a dictionary 25. The character image data that has been normalized by the normalization block 13a inside the pre-processing block 13 of the data input unit 11 is inputs to the contour tracing block 22. The contour tracing block 22 performs sequential tracing of the contour of the character image. This contour of the character image is a continuous trace of white pixels in contact with black pixels. For example, in the character image "1" indicated in FIG. 10A, a trace of white picture elements on the outside of a closed line is the contour of the image "1". The direction code array extraction block 23 supplies direction codes with respect to each of the pixels of the contour of the above described character image. This direction code is, as indicated in FIG. 9, a code indicating the direction of alignment (inclination) of the black pixels in contact with the white pixel. The eight types of direction code of "1" through "8" are predetermined. The direction code array extraction block 23 extracts the direction code array which expresses the arrangement of the direction codes. For example, the direction code indicated in FIG. 10B is obtained with respect to the image data indicated in FIG. 10A. Then, in the case that there is only one isolated code, that code is eliminated as noise, and codes for which there are two or more are collected. The arrangement of direction codes that is obtained as the result is the direction code array. Pairs of characters that are easily mistaken are made beforehand, for example, for the cases of (1,7), (0,6) and the like. Identification rules are stored in the dictionary 25 beforehand, which are determined on the basis of the direction code arrays with respect to the pairs of those characters (numerals). In the case of numerals, differences in the shape on the left and right enable the differences between the characters to be clearly seen. Accordingly, for example, in the case of the pair of numbers "0" and "6", attention is placed on the difference in the shape on the right-hand side so that the dictionary is created so as to relate to the direction code arrays of the right sides. The matching block 24 compares the direction code array obtained from the image data with the identification rules in the dictionary 25 and determines whether or not the character image corresponds to one of the paired numbers. The processing results of the matching block 24 are applied to the recognition results output unit 15 as the recognition results.

If two candidates are selected by the candidate selection block 21, then the above described two-character recognition system 20 performs processing with respect to those two candidates. In addition, if the candidate selection block 21 selects three or more candidates, then pairs of two candidates (numerals) are made and processing by the two-character recognition system 20 is performed each of the pairs of candidates. Then, when the results of processing with respect to pairs of two candidates by the two-character recognition system 20 are the same (i.e. they are the same character), the result is output as the recognition result. In addition, if the results of processing by the two-character recognition system 20 are different, then the rejection judgment is performed.

In the embodiment described above, when two or more candidates have been selected, the two-character recognition system 20 performs the final recognition processing but this final recognition processing can also be performed by another recognition system such as a recognition system using a neural network system.

Figure 11:
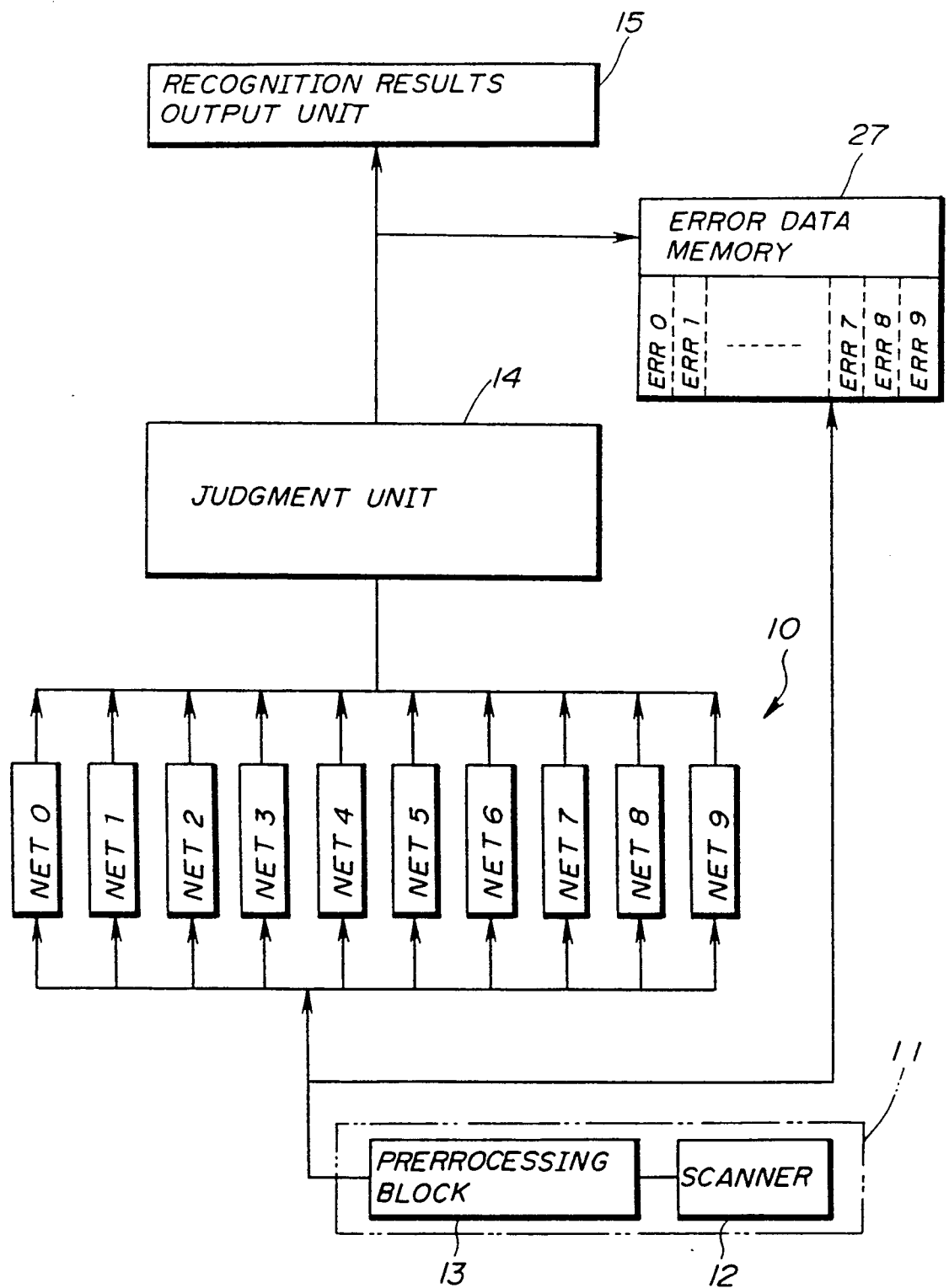
FIG. 11 is a block diagram indicating yet another embodiment of the pattern recognition apparatus according to the present invention.
Figure 12:
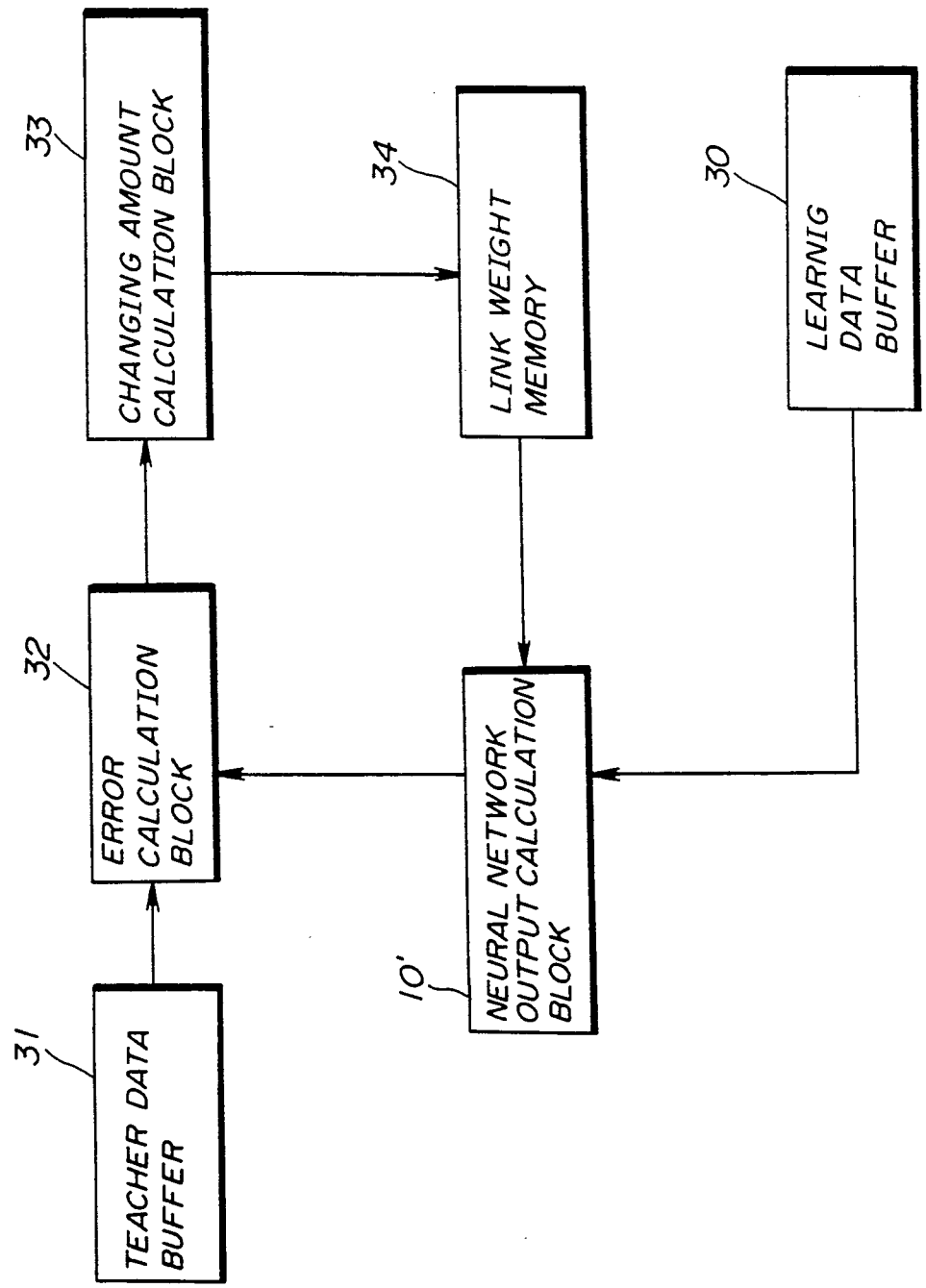
FIG. 12 is a functional block diagram describing learning in accordance with the back propagation method.
Figure 13:
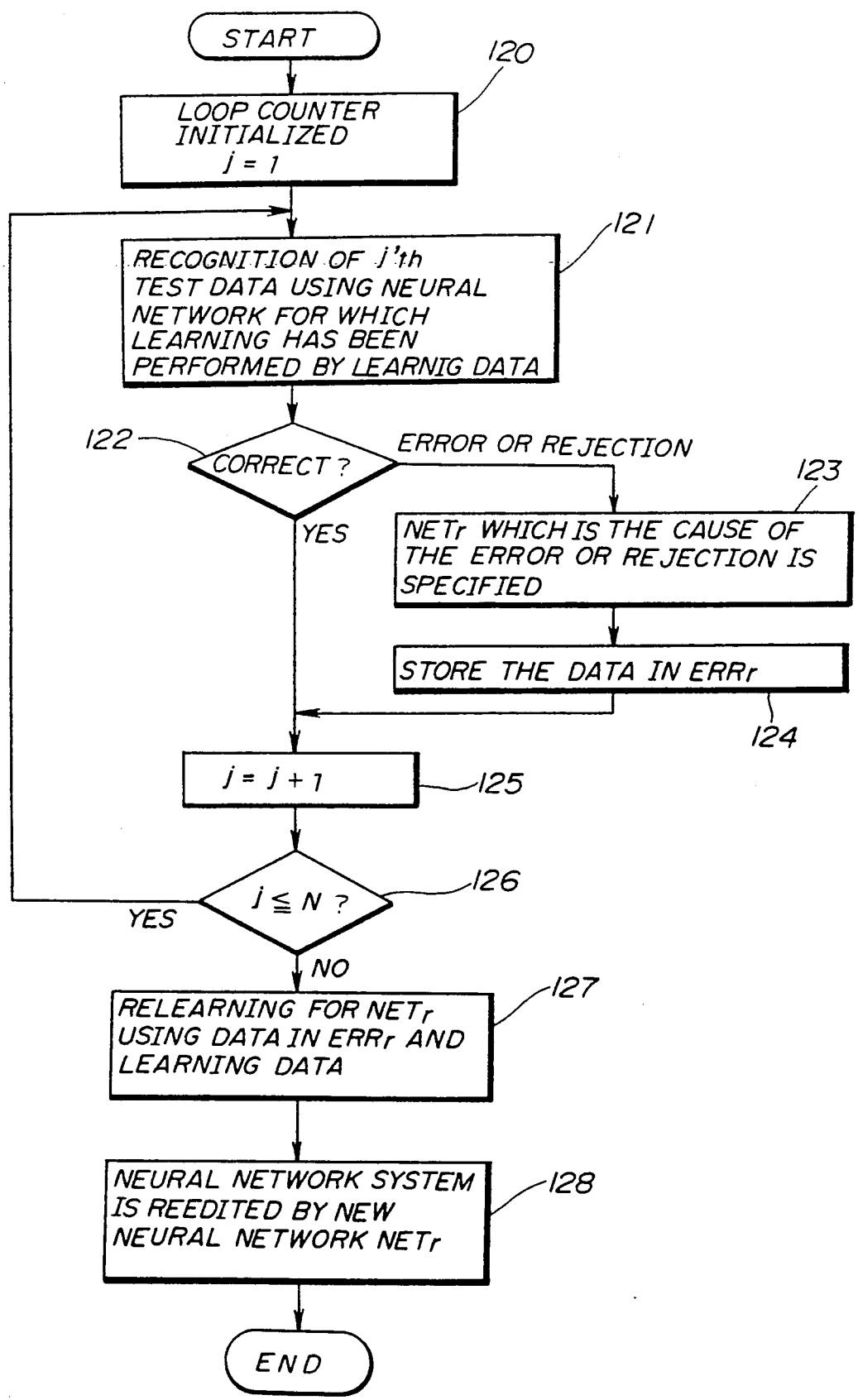
FIG. 13 is a flow chart indicating relearning processing.

The following is a description of yet another embodiment of a pattern recognition apparatus according to the present invention, with reference to FIGS. 11 through 13. This embodiment is a pattern recognition apparatus that performs the appropriate relearning for the neural network unit system 10.

FIG. 11 is a block diagram indicating the fundamental configuration of a pattern recognition apparatus. In the same manner as the pattern recognition apparatus indicated in FIG. 1, this pattern recognition apparatus is provided with the data input unit 11, the neural network system 10, the judgment unit 14 and a recognition results output unit 15. The data input unit 11 has the scanner 12 and the preprocessing block 13.

This pattern recognition apparatus is also provided with a error data memory 27 in which image data that is erroneous or in which the rejection judgment has been performed are registered. This error data memory 27 has a memory region ($ERR_i$) corresponding to each of the neural networks ($NET_i$). These memory regions ($ERR_i$) are referred to hereinafter as memories ($ERR_i$).

Learning for the neural networks ($NET_0$) through ($NET_9$) is performed beforehand using predetermined learning data. FIG. 12 indicates a functional block relating to the learning. A description will now be given of the learning for the neural network ($NET_0$) corresponding to the class $C_0$ expressing the numeral "0".

Image patterns including all of the numbers from "0" to "9" as the learning data are stored beforehand in the learning data buffer 30. The teacher data corresponding to the learning data is stored in a teacher data buffer 31. The teaching data is (1, 0) if the learning data is "0", and is (0, 1) if the learning data is not "0". The learning data read from the learning data buffer 30 is supplied to the neural network output calculation block 10'. The neural network output calculation block 10' ($NET_0$) uses the link weight inside the link weight memory 34 to calculate the output values ($A_i$, $B_i$) from the learning data. The error calculation block 32 calculates the root deviation using the teacher data and the output values ($A_i$, $B_i$) from the neural network output calculation block 10'. The changing amount calculation block 33 uses the root deviation from the error calculation block 32 to change the link weight in accordance with the general $\delta$ rule. Then, the link weight that is newly stored in the link weight memory 34 is used to calculate the output value with respect to the following learning data.

The processing that is described above is repeatedly performed with respect to each of the learning data and the learning for the neural network NET finishes when the learning data can be practically correctly recognized. The learning for the other neural networks $NET_1$ through $NET_9$ is performed in the same manner as has been described above.

The learning method described above is called the error back propagation method.

Furthermore, this pattern recognition apparatus performs re-learning. This re-learning is performed in accordance with the flow chart indicated in FIG. 13.

N number of data for recognition testing are prepared beforehand.

In processing step 120, a loop counter provided inside the pattern recognition apparatus is initialized to j=1. The j'th data for recognition testing is recognized (in processing step 121) using the neural network for which learning has been performed as described above. Judgment is then performed for whether those recognition results are correct or not (in processing step 122). In the judgment of processing step 122, if the recognition results are either erroneous recognition or rejection, then the neural network ($NET_r$) that was the cause of the erroneous recognition or rejection is specified (in processing step 123). Then, data for recognition testing is stored in the memory ($ERR_r$) corresponding to that neural network ($NET_r$).

After that, the loop counter is incremented (in processing step 125) and the following data for recognition testing is used to perform processing in the same manner. Then, the processing of steps 121, 122, 123 and 126 is performed until the count value j of the loop counter becomes j=N (processing step 126), that is to say, for all of the data for recognition testing.

Figure 6:
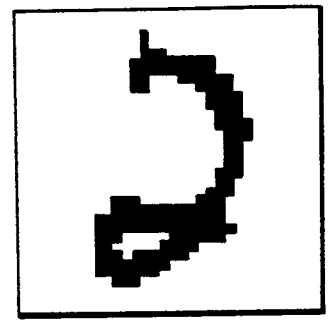

For example, the output of each of the neural networks ($NET_i$) with respect to the feature vectors of an image (a handwritten numeral "2") indicated as an example in FIG. 6, is as indicated in the following TABLE 4.

TABLE 4

| | |
|---|---|
| $A_0 = 0.000$ | $B_0 = 1.000$ |
| $A_1 = 0.000$ | $B_1 = 1.000$ |
| $A_2 = 0.000$ | $B_2 = 1.000$ |
| $A_3 = 0.000$ | $B_3 = 1.000$ |
| $A_4 = 0.000$ | $B_4 = 1.000$ |

TABLE 4-continued

| | |
|---|---|
| $A_5 = 0.000$ | $B_5 = 1.000$ |
| $A_5 = 0.000$ | $B_5 = 1.000$ |
| $A_6 = 0.000$ | $B_6 = 1.000$ |
| $A_7 = 0.044$ | $B_7 = 0.956$ |
| $A_8 = 0.000$ | $B_8 = 1.000$ |
| $A_9 = 0.000$ | $B_9 = 1.000$ |

In this case, the judgment is that of rejection. The cause of this rejection is because an erroneous output value ($A_2 < B_2$) appeared in the neural network $NET_2$. Accordingly, the image data indicated in FIG. 6 is stored in the memory $ERR_2$.

When the above described processing is completed with respect to all of the data for recognition testing, relearning is performed with respect to the neural networks ($NET_r$) that become the causes of erroneous recognition or rejection (processing step 127). This relearning is performed using the learning data and the data stored in the memory ($ERR_r$). This re-learning is performed in accordance with the above described back propagation method, for example. When this relearning has been completed, the neural network system 10 is re-edited by the new neural networks ($NET_r$).

As has been described above, according to the present invention, a neural network is provided with respect to each identification class, and the output layer of each of those neural network has only two output units and so the learning is easier than a conventional neural network having many output units. In addition, the re-learning may be performed only for the neural networks corresponding to classes that have much erroneous recognition. Furthermore, by combining small-scale neural networks, the accuracy of recognition can be improved for each of the neural networks. As a result, the recognition ratio increases for the entire neural network. Still furthermore, neural networks are provided with respect to each class and so the rejection judgment can be performed without using appropriate threshold values.

In addition, data that has been judged as erroneous or rejected data is stored in a memory corresponding to the neural network that caused that error or rejection and so the data that is stored in the memory can also be included in the relearning so that the re-learning can proceed definitely.

Further, the present invention is not limited to these embodiments, but various variations and modifications may be made without departing from the scope of the present invention.

What is claimed is:

1. A pattern recognition apparatus, comprising:
   (a) pattern input means for inputting pattern data and learning data:
   (b) a neural network system including a plurality of neural networks, wherein:
      (1) each of said plurality of neural networks receives said pattern data from said pattern input means;
      (2) each of said plurality of neural networks is assigned a corresponding one of a plurality of identification classes and has only two output units consisting of a first unit (Uo1) and a second unit (Uo2);
      (3) learning for each of said plurality of neural networks is performed by using said learning data belonging to all of said identification classes so that:
         (A) when each of said neural networks receives said learning data belonging to said corresponding one of the identification classes:
            (i) an output value A from said first unit (Uo1) equals a first value V1; and
            (ii) an output value B from said second unit (Uo2) equals a second value V2; and
         (B) when each of said neural networks receives learning data belonging to one of said identification classes other than said corresponding one of the identification classes;
            (i) said output value A from said first unit (Uo1) equals said second value V2 and
            (ii) said output value B from said second unit (Uo2) equals said first value V1; and
   (c) judgment means for judging which one of the identification classes said pattern data from said pattern input means belongs to, on the basis of output values A and B from said two output units (Uo1) and (Uo2) of all neural networks.

2. The image pattern recognition apparatus as claimed in claim 1 wherein said first value $V_1$ is equal to 1 and said second value $V_2$ is equal to 0.

3. A pattern recognition apparatus, comprising:
   (a) pattern input means for inputting pattern data and learning data:
   (b) a neural network system including a plurality of neural networks, wherein:
      (1) each of said plurality of neural networks receives said pattern data from said pattern input means;
      (2) each of said plurality of neural networks is assigned a corresponding one of a plurality of identification classes and has only two output units consisting of a first unit (Uo1) and a second unit (Uo2);
      (3) learning for each of said plurality of neural networks is performed by using said learning data belonging to all of said identification classes so that:
         (A) when each of said neural networks receives said learning data belonging to said corresponding one of the identification classes:
            (i) an output value A from said first unit (Uo1) equals a first value V1; and
            (ii) an output value B from said second unit (Uo2) equals a second value V2; and
         (B) when each of said neural networks receives learning data belonging to one of said identification classes other than said corresponding one of the identification classes;
            (i) said output value A from said first unit (Uo1) equals said second value V2 and
            (ii) said output value B from said second unit (Uo2) equals said first value V1; and
   (c) judgment means for judging which one of the identification classes said pattern data from said pattern input means belongs to, on the basis of output values A and B from said two output units (Uo1) and (Uo2) of all neural networks, wherein said judgment means has means for judging whether said pattern belongs to one of said identification classes, a corresponding one of said plurality of neural networks satisfying the condition of output values A and B being $A > B$.

4. A pattern recognition apparatus, comprising:
   (a) pattern input means for inputting pattern data and learning data:

(b) a neural network system including a plurality of neural networks, wherein:
  (1) each of said plurality of neural networks receives said pattern data from said pattern input means;
  (2) each of said plurality of neural networks is assigned a corresponding one of a plurality of identification classes and has only two output units consisting of a first unit (Uo1) and a second unit (Uo2);
  (3) learning for each of said plurality of neural networks is performed by using said learning data belonging to all of said identification classes so that:
    (A) when each of said neural networks receives said learning data belonging to said corresponding one of the identification classes:
      (i) an output value A from said first unit (Uo1) equals a first value V1; and
      (ii) an output value B from said second unit (Uo2) equals a second value V2; and
    (B) when each of said neural networks receives learning data belonging to one of said identification classes other than said corresponding one of the identification classes;
      (i) said output value A from said first unit (Uo1) equals said second value V2 and
      (ii) said output value B from said second unit (Uo2) equals said first value V1; and
(c) judgment means for judging which one of the identification classes said pattern data from said pattern input means belongs to, on the basis of output values A and B from said two output units (Uo1) and (Uo2) of all neural networks, wherein said judgement means has:
  (1) candidate selection means for selecting at least one of said plurality of said neural networks satisfying the condition of output values A and B being A>B as a candidate neural network; and
  (2) means for judging that said pattern data belongs to one of said identification classes corresponding to said candidate neural network when one candidate neural network is selected by said candidate selection means.

5. A pattern recognition apparatus, comprising:
(a) pattern input means for inputting pattern data and learning data:
(b) a neural network system including a plurality of neural networks, wherein:
  (1) each of said plurality of neural networks receives said pattern data from said pattern input means;
  (2) each of said plurality of neural networks is assigned a corresponding one of a plurality of identification classes and has only two output units consisting of a first unit (Uo1) and a second unit (Uo2);
  (3) learning for each of said plurality of neural networks is performed by using said learning data belonging to all of said identification classes so that:
    (A) when each of said neural networks receives said learning data belonging to said corresponding one of the identification classes:
      (i) an output value A from said first unit (Uo1) equals a first value V1; and
      (ii) an output value B from said second unit (Uo2) equals a second value V2; and
    (B) when each of said neural networks receives learning data belonging to one of said identification classes other than said corresponding one of the identification classes:
      (i) said output value A from said first unit (Uo1) equals said second value V2 and
      (ii) said output value B from said second unit (Uo2) equals said first value V1; and
(c) judgment means for judging which one of the identification classes said pattern data from said pattern input means belongs to, on the basis of output values A and B from said two output units (Uo1) and (Uo2) of all neural networks, wherein said judgment means has:
  (1) candidate selection means for selecting at least one of said plurality of neural networks satisfying the condition of output values A and B being A>B as a candidate neural network, and
  (2) means for judging that said pattern belongs to one of said identification classes corresponding to one of the plurality of neural networks for which the output value A is the greatest when two or more candidate neural networks are selected by said candidate selection means.

6. A pattern recognition apparatus, comprising:
(a) pattern input means for inputting pattern data and learning data:
(b) a neural network system including a plurality of neural networks, wherein:
  (1) each of said plurality of neural networks receives said pattern data from said pattern input means;
  (2) each of said plurality of neural networks is assigned a corresponding one of a plurality of identification classes and has only two output units consisting of a first unit (Uo1) and a second unit (Uo2);
  (3) learning for each of said plurality of neural networks is performed by using said learning data belonging to all of said identification classes so that:
    (A) when each of said neural networks receives said learning data belonging to said corresponding one of the identification classes:
      (i) an output value A from said first unit (Uo1) equals a first value V1; and
      (ii) an output value B from said second unit (Uo2) equals a second value V2; and
    (B) when each of said neural networks receives learning data belonging to one of said identification classes other than said corresponding one of the identification classes:
      (i) said output value A from said first unit (Uo1) equals said second value V2 and
      (ii) said output value B from said second unit (Uo2) equals said first value V1; and
(c) judgment mean for judging which one of the identification classes said pattern data from said pattern input means belongs to, on the basis of output values A and B from said two output units (Uo1) and (Uo2) of all neural networks, wherein said judgment means has:
  (1) candidate selection means for selecting at least one of said plurality of neural networks satisfying the condition of output values A and B being A>B as a candidate neural network, and
  (2) output means for outputting rejection information expressing that said pattern data does not belong to any identification class, when a candidate neural network is not selected by said candidate selection means.

7. A pattern recognition apparatus, comprising:
(a) pattern input means for inputting pattern data and learning data:
(b) a neural network system including a plurality of neural networks, wherein:
  (1) each of said plurality of neural networks receives said pattern data from said pattern input means;
  (2) each of said plurality of neural networks is assigned a corresponding one of a plurality of identification classes and has only two output units consisting of a first unit (Uo1) and a second unit (Uo2);
  (3) learning for each of said plurality of neural networks is performed by using said learning data belonging to all of said identification classes so that:
    (A) when each of said neural networks receives said learning data belonging to said corresponding one of the identification classes:
      (i) an output value A from said first unit (Uo1) equals a first value V1; and
      (ii) an output value B from said second unit (Uo2) equals a second value V2; and
    (B) when each of said neural networks receives learning data belonging to one of said identification classes other than said corresponding one of the identification classes:
      (i) said output value A from said first unit (Uo1) equals said second value V2 and
      (ii) said output value B from said second unit (Uo2) equals said first value V1; and
(c) judgment means for judging which one of the identification classes said pattern data from said pattern input means belongs to, on the basis of output values A and B from said two output units (Uo1) and (Uo2) of all neural networks, wherein said judgment means has:
  (1) candidate selection means for selecting at least one of said plurality of neural networks satisfying the condition of output values A and B being A>B as a candidate neural network, and
  (2) output means for outputting rejection information expressing that said pattern data does not belong to any identification class, when two or more candidate neural networks are selected by said candidate selection means.

8. A pattern recognition apparatus, comprising:
(a) pattern input means for inputting pattern data and learning data:
(b) a neural network system including a plurality of neural networks, wherein:
  (1) each of said plurality of neural networks receives said pattern data from said pattern input means;
  (2) each of said plurality of neural networks is assigned a corresponding one of a plurality of identification classes and has only two output units consisting of a first unit (Uo1) and a second unit (Uo2);
  (3) learning for each of said plurality of neural networks is performed by using said learning data belonging to all of said identification classes so that:
    (A) when each of said neural networks receives said learning data belonging to said corresponding one of the identification classes:
      (i) an output value A from said first unit (Uo1) equals a first value V1; and
      (ii) an output value B from said second unit (Uo2) equals a second value V2; and
    (B) when each of said neural networks receives learning data belonging to one of said identification classes other than said corresponding one of the identification classes:
      (i) said output value A from said first unit (Uo1) equals said second value V2 and
      (ii) said output value B from said second unit (Uo2) equals said first value V1; and
(c) judgment means for judging which one of the identification classes said pattern data from said pattern input means belongs to, on the basis of output values A and B from said two output units (Uo1) and (Uo2) of all neural networks, wherein said judgment means has:
  (1) candidate selection means for selecting at least one of said plurality of neural networks satisfying the condition of output values A and B being A>B as a candidate neural network, and
  (2) another recognition system that judges that said pattern data is related to one of identification classes corresponding to each candidate neural network, on the basis of said pattern data input from said pattern input means when said two or more candidates have been selected by said candidate selection means.

9. The image recognition apparatus as claimed in claim 8 wherein said other recognition system has a judgment means for judging to which of each pair of identification classes, said pattern data belongs.

10. The image recognition apparatus as claimed in claim 1 further comprising:
storage means provided to correspond to each of said plurality of neural networks,
means for storing a test pattern in said storage means corresponding to each of said plurality of said neural network that causes an erroneous judgment when said test pattern relating to an arbitrary identification class for which recognition is possible is judged as belonging to another identification class, and for when said test pattern is judged as not belonging to any identification class,
said test patterns stored inside storage means corresponding to said neural networks being used for learning for those neural networks.

11. The pattern recognition apparatus as claimed in claim 1, wherein:
at least one of said first value $V_1$ and said second value $V_2$ is not equal to either 0 or 1.

* * * * *